United States Patent [19]
Lee

[11] Patent Number: 5,243,466
[45] Date of Patent: Sep. 7, 1993

[54] ZOOM LENS

[75] Inventor: Hung-Te Lee, Chutung, Taiwan

[73] Assignee: Industrial Technology Research Institute, Taiwan, Taiwan

[21] Appl. No.: 813,007

[22] Filed: Dec. 24, 1991

[51] Int. Cl.$^5$ .............................................. G02B 15/14
[52] U.S. Cl. ................................................................ 359/692
[58] Field of Search ................................ 359/692, 691

[56] References Cited

U.S. PATENT DOCUMENTS 4,838,669  6/1989  Ogata et al. ........................... 359/692
5,109,299  4/1992  Kato ..................................... 359/692

Primary Examiner—Scott J. Sugarman
Attorney, Agent, or Firm—Bacon & Thomas

[57] ABSTRACT

A lens system comprising a positive power lens assembly and a negative power lens assembly, in which the positive power lens assembly includes a cemented doublet and a two-surface aspheric lens. The present invention discloses a zoom lens with a 2.57×zoom ratio.

4 Claims, 3 Drawing Sheets

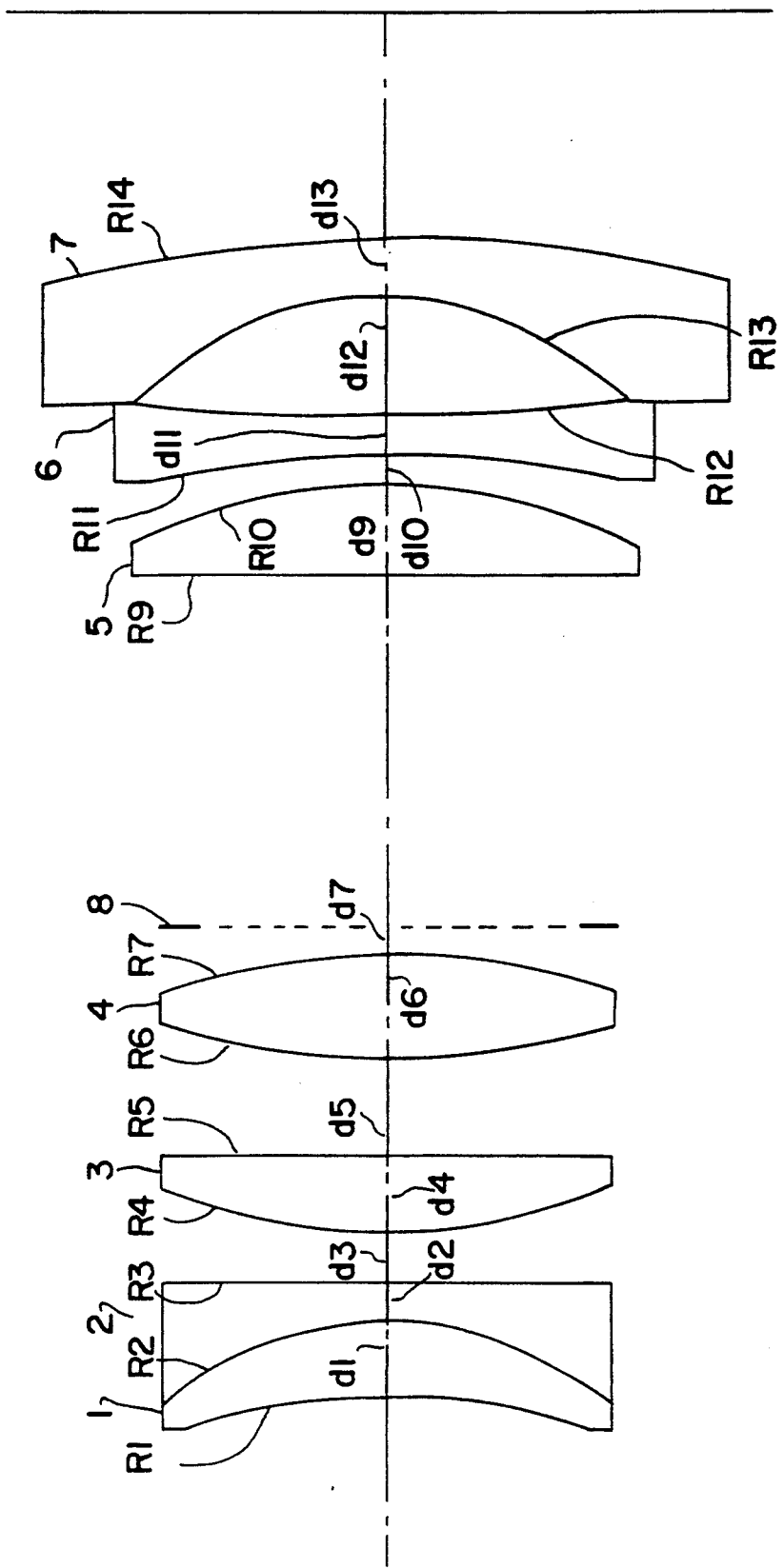

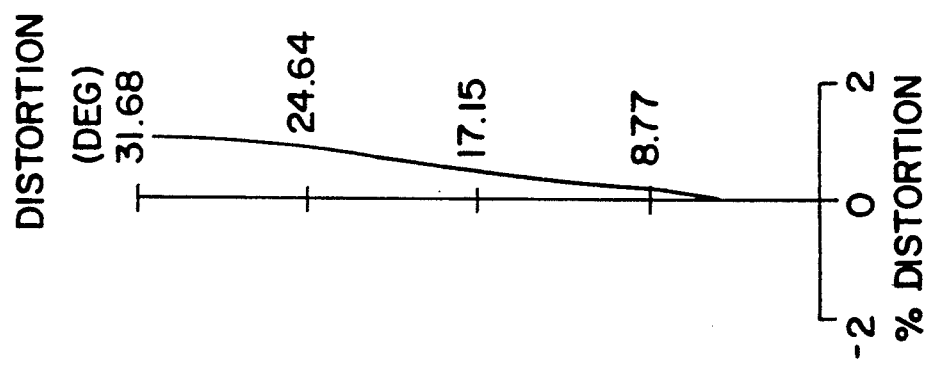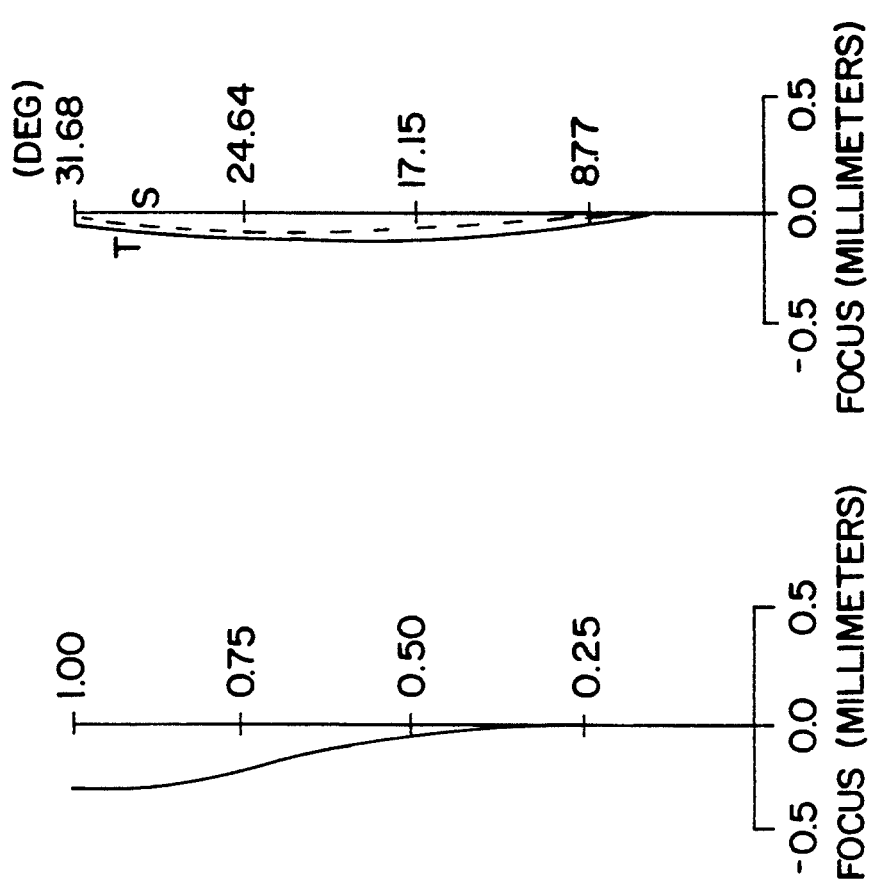

LONGITUDINAL SPHERICAL ABER.

ASTIGMATIC FIELD CURVES (DEG)

DISTORTION (DEG)

LONGITUDINAL SPHERICAL ABER.

ASTIGMATIC FIELD CURVES (DEG)

DISTORTION (DEG)

ZOOM LENS

FIELD OF THE INVENTION

The invention relates to a zoom lens, and in particular to a zoom lens assembly to be used in compact cameras. The invented zoom lens, which is meant especially for use as a compact camera objective lens, possesses exceptional imaging quality and is suited to miniaturization.

BACKGROUND OF THE INVENTION

During typical use, varying photographic demands require that cameras be fitted with lenses of different focusing capabilities. Inconvenience for the user arises when these fixed-focus lenses have to be changed in order to meet differing demands.

The recently developed "zoom lens" was created to overcome the aforementioned drawbacks by providing a variable focus lens, with a 2× to 3× zoom ratio, which the user can employ to meet the demands of differing situations.

Most zoom lens designs incorporate telephoto lens sets comprising two lens assemblies—one group of positive power lenses and another of negative power lenses—which move the principal plane forward and shorten the back focal length.

Moving the two assemblies relative to each other alters the air space between them, thereby changing focus.

Recent technical advances in precision camera manufacture has led the industry to miniaturize camera components. Due to their weight and large size, the miniaturization of zoom lenses has become an important item of technical research.

Lens miniaturization can be approached from two directions. The first is to reduce the length of the lens without sacrificing image quality. The other approach is to reduce the number of component lenses; i.e., maintaining image quality and providing a greater zoom ratio, while keeping the length (the distance from the first surface vertex to the film) of the entire lens set the same, but using fewer component lenses. The industry has been making continuous efforts toward achieving both these goals.

One means of shortening the length of the entire lens set is to reduce the radius of curvature of the component lenses. However, reducing the radius of curvature increases the power, which may lead to major aberration changes when Zooming the Lens, making appropriate image quality impossible to achieve.

Increasing the number of lenses can mitigate the need for a small radius of curvature, as so doing allows a reduction in the power of each component lens, which then reduces the aberration produced during Zooming. This method, however, is unsuited to production since the increased number of lenses greatly raises the cost of the device.

U.S. Pat. No. 4,830,476, disclosed an improved zoom lens. The zoom ratio of this patent is, however, only 2×.

The industry is thus in need of an improved zoom lens which can be miniaturized, provides high image quality, and has a high zoom ratio.

It is thus an object of this invention to provide a miniaturized zoom lens.

Another object of this invention is to provide a zoom lens with improved image quality.

Another object of this invention is to provide a zoom lens with a higher zoom ratio.

A further object of this invention is to provide a new design for a zoom lens assembly.

SUMMARY OF THE INVENTION

The above mentioned goals have all been achieved by the invention by using a novel lens assembly; specifically, a zoom lens combining two lens assemblies, in which the first lens assembly includes a cemented doublet and an aspheric lens, which in conjunction are capable of raising zoom ratio of the zoom lens to 2.57×.

BRIEF DESCRIPTION OF THE DRAWINGS

In the drawings,

FIG. 1 is a diagram of the lens assemblies in the zoom lens according to an embodiment of the present invention.

FIG. 2 is a curve diagram of aberrations produced when the zoom lens is disposed at a wide-angle setting. In the diagram, (a) illustrates the longitudinal spherical aberration, (b) illustrates the astigmatism, and (c) illustrates the distortion.

DESCRIPTION OF THE INVENTION

Figure 3A:
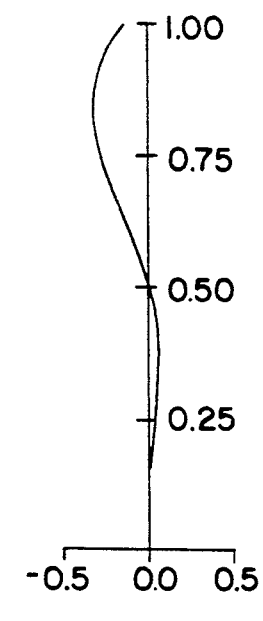
FIG. 3 is a curve diagram of aberrations produced when the zoom lens is at a medium-angle setting. In the diagram, (a) illustrates the longitudinal spherical aberration, (b) illustrates the astigmatism, and (c) illustrates the distortion.

As noted above, miniaturization of zoom lenses can be approached by either reducing the number of component lenses or by shortening the distance between the front and back component lenses. The present invention proposes a zoom lens which uses a reduced number of component lenses (seven) to achieve a zoom ratio of 2.57×. The present invention also minimizes aberration produced during Zooming of the zoom lens.

FIG. 1 illustrates a zoom lens suited to the present invention. As shown in the figure, this embodiment includes two lens assemblies, referred to respectively as the first lens assembly and the second lens assembly, wherein the first lens assembly is a positive power lens, and the second lens assembly is a negative power lens. The goal of this set of assemblies is to reduce the overall length of the lens (i.e. the overall distance between the first component lens and the film).

In this embodiment, the first lens assembly includes a cemented doublet and an aspheric lens. The second lens assembly includes two negative lenses and one positive lens.

It is known that the abovementioned design tends to produce positive distortion at wide-angle settings, the reason for which is that the second lens assembly acts as a negative lens. To resolve this problem, the present invention makes use of the first lens assembly to produce a negative distortion that serves to compensate for the abovementioned positive distortion. Thus the design maximizes the height at which the off-axis ray strikes the lens. In other words, the first set of cemented lenses, which is in proximity to the object space, includes a negative power lens that serves to provide a more optimal distortion. Also, since the first pair of lenses in the first lens assembly of the present embodiment acts as a negative power lens, the lens in proximity to the image space must be a positive power lens so that the first lens assembly becomes, in effect, a positive power lens.

Next, in order to lower the telephoto ratio of the zoom lens, the present invention utilizes a design wherein second principal plane is in as close proximity as possible to the object space. To achieve this goal, the component lenses in the second lens assembly are arranged according to the order "positive lens—negative lens—negative lens," effectively making the second lens assembly a negative power lens.

Because the present invention attempts to achieve a zoom ratio of 2.57× with only seven lenses, eliminating the aberration produced therefrom becomes a major problem. In view of this, the present invention makes use of an aspheric lens to provide improved image quality.

The equation for the radial direction of the aspheric surface can generally be expressed as:

$$Z = \frac{CY^2}{1 + [1 - (1 + K)C^2Y^2]^{(\frac{1}{2})}} + A_4Y^4 + A_6Y^6 + A_8Y^8 + A_{10}Y^{10}$$

where Z is the sag, C is the curvature, K is the conic constant, Y is the vertical coordinate from the lens' optical axis, $A_4$ is the fourth order aspheric coefficient, $A_6$ is the sixth order aspheric coefficient, $A_8$ is the eighth order aspheric coefficient, and $A_{10}$ is the tenth order aspheric coefficient.

According to the present embodiment, it has been found that to achieve the abovementioned goals the optimal conditions for the aspheric lens are as shown below:

$$-5.9 < K_1 < -4.5 \quad (1)$$

$$-3.6 < K_2 < -3 \quad (2)$$

where $K_1$ is the K value for the aspheric lens facing the object space, and $K_2$ is the K value for the aspheric lens facing the image space. One of the most favorable results is obtained when $K_1 = -5.51$ and $K_2 = -3.39$.

In summary, the preferred conditions for the present invention, a zoom lens, are as follows:

$$1.3 < f_w/f_1 < 1.7 \quad (3)$$

$$0.2 < f_B/f_S < 0.6 \quad (4)$$

where $f_W$ is the focal length of the zoom lens at the wide-angle setting; $f_1$ is the focal length of the first lens assembly; $f_B$ is the back focal length at the wide-angle setting; $f_s$ is the system focal length at the wide-angle setting.

The lens system created under condition (3) possesses a relatively optimal power ratio. Exceeding these conditions permits a reduction in the size of the entire lens set, but causes an undesirable increase in aberration; conversely, the lens cannot be reduced in size if these conditions are not reached.

When the back focal length adheres to condition (4), the lens can be reduced in size without negatively influencing imaging quality.

Below the range of condition (4), the diameter of the second lens assembly increases; exceeding the upper limit of condition (4) permits a reduction in size of the second lens assembly, but increases the length of the entire lens set, thereby precluding lens miniaturization.

Improved results can be obtained by using a cemented doublet, for which the preferred conditions are:

$$1.70 < N_{1n} \quad (5)$$

$$18 < V_{1p} - V_{1n} \quad (6)$$

where $N_{1n}$ is the refractivity of the negative lens in the cemented doublet; $V_{1p}$ is the Abbe number of the positive lens; $V_{1n}$ is the Abbe number of the negative lens.

Adherence to the above conditions reduces the effects of chromatic aberration on the lens system.

In the preferred embodiments of the present invention, the radius of curvature $R_1$ in the first lens of the first lens assembly is negative, a design feature which limits distortion by producing a negative distortion in the first lens assembly that serves to compensate for the positive distortion produced by the second lens assembly.

DESCRIPTION OF THE PREFERRED EMBODIMENTS

The embodiment constructed according to the present invention is shown in FIG. 1, wherein the first lens assembly (1) (a negative lens), and the second lens (2) (also a negative lens), are combined into a pair of negative cemented doublets.

The radii of curvature of the three lens surfaces therein are $R_1$, $R_2$, and $R_3$, and the thicknesses of the two component lenses are $d_1$ and $d_2$ (3) is the third lens (a negative lens), possessing radii of curvature of $R_4$ and $R_5$ respectively, and a thickness $d_4$. (4) is the fourth lens (a positive lens), possessing an aspheric surface, radii of curvature of $R_6$ and $R_7$, and a thickness $d_6$. (8) is an optical stop. The distance between the second (2) and third lenses (3) is $d_3$; the distance between the third (3) and fourth (4) lenses is $d_5$; the distance between the fourth (4) lens and the optical stop (8) is $d_7$.

The abovementioned lenses and optical stop (8) constitute the first lens assembly.

The second lens assembly includes the fifth lens (5), possessing a surface with radii of curvature of $R_9$ and $R_{10}$, and a thickness of $d_9$; the sixth lens (6), possessing a surface with radii of curvature of $R_{11}$ and $R_{12}$, and a thickness of d11; the seventh lens (7) possesses a surface with radii of curvature of $R_{13}$ and $R_{14}$, and a thickness of $d_{13}$. The distance between the fifth (5) and sixth (6) lenses is $d_{10}$; the distance between the sixth (6) and seventh (7) lenses is $d_{12}$.

The relevant data in the embodiment are as shown in Table 1 (wherein FNo is the F number, f is the focal length, Z is the zoom ratio, W is the semi-angle, $f_8$ is the back focal length, N is the material refractivity, R is the radius of curvature, and V is the material Abbe number.)

TABLE 1

| | | | | |
|---|---|---|---|---|
| FNo = 1:3.5-5.1-7.5 | | F = 35-56.13-90 | | Z = 2.57 |
| W = 31.7-21.1-13.5 | | f8 = 8.17-27.10-57.46 | | |
| Surface No. | R in mm.) | d (in mm.) | N | V |
| 1 | −21.876 | 2.70 | 1.6228 | 57.0 |
| 2 | −12.420 | 1.50 | 1.83400 | 37.2 |
| 3 | −172.973 | 1.69 | | |
| 4 | 21.321 | 2.88 | 1.61272 | 58.7 |
| 5 | ∞ | 3.46 | | |
| 6 | 26.256 | 3.64 | 1.49170 | 57.2 |
| 7 | −22.154 | 1.00 | | |
| 8 | ∞* | 12.59-6.68-3.00 | | |
| 9 | ∞ | 3.28 | 1.49831 | 65.1 |
| 10 | −21.441 | 0.99 | | |
| 11 | −43.003 | 1.5 | 1.77250 | 49.6 |
| 12 | 107.695 | 4.23 | | |
| 13 | −12.833 | 2.00 | 1.77250 | 49.6 |
| 14 | −52.819 | | | |

*optical stop

The aspheric coefficients for the sixth surface are:
$K1 = -5.51.28$
$A4 = 0$
$A6 = 0$
$A8 = 0$
$A10 = 0$ The aspheric coefficients for the seventh surface are:
$K2 = -3.39188$
$A4 = 0.13928 * 10^{-4}$
$A6 = -0.91070 * 10^{-8}$
$A8 = 0.32802 * 10^{-8}$
$A10 = -0.21107 * 10^{-10}$ The lens created according to the above coefficients possesses a focal length adjustable from 35 mm to 90 mm, and a zoom ratio of 2.57.

With the first lens assembly and second lens assembly disposed at the wide-angle, medium-angle and narrow-angle settings, the following results are obtained for the longitudinal spherical aberration, astigmatism and distortion:

FIG. 2 shows the aberrational curves for the zoom lens when disposed at the wide-angle setting (semi-angle=31.68°) according to the present invention. As can be seen from the figure, the spherical aberration is between −0.25 mm and 0 mm, the astigmatism is between −0.1 mm and 0 mm, and the distortion is between 0% and 1%. These data conform to application requirements.

Figure 3B:
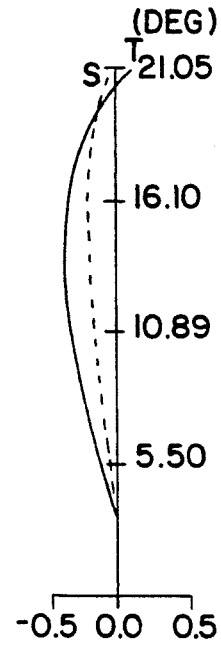
Figure 3C:
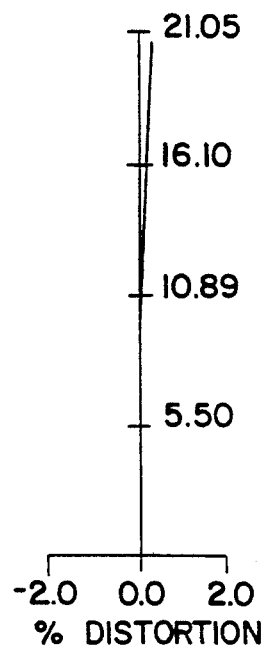

FIG. 3 shows the aberrational curves for the zoom lens when disposed at the medium-angle setting (semi-angle=21.05°) according to the present invention. As can be seen from the figure, the spherical aberration is between −0.3 mm and 0 mm, the astigmatism is between −0.2 mm and 0.2 mm, and the distortion is between 0% and 0.2%. These data conform to application requirements.

Figure 4A:
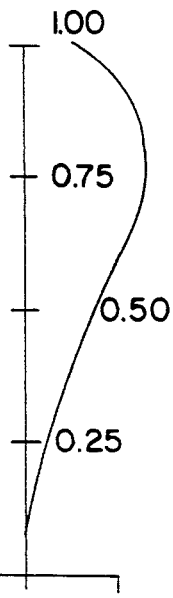
FIG. 4 is a curve diagram of aberrations produced when the zoom lens is at a narrow-angle setting. In the diagram, (a) illustrates the longitudinal spherical aberration, (b) illustrates the astigmatism, and (c) illustrates the distortion.
Figure 4B:
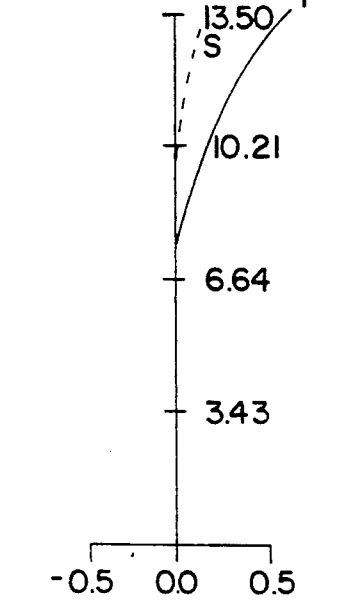
Figure 4C:
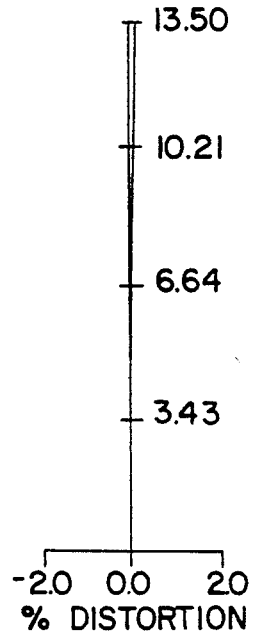

FIG. 4 shows the aberrational curves for the zoom lens when disposed at the narrow-angle setting (semi-angle=13.50°) according to the present invention. As can be seen from the rration is between 0 mm and 0.5 mm, the astigmatism is between −0.2 mm and 0.2 mm, and the distortion is between 0% and 0.2%. These data conform to application requirements.

As can be seen from the above description, the present invention permits an increase in the lens' zoom ratio to 2.57 without a corresponding increase in the length of the lens or the number of lenses. The data also show that the zoom lens provides exceptional image quality, thereby satisfying industry demands.

The embodiments described above serve only as examples of the features and results of the present invention; the scope of the present invention is not confined to the details set forth therein. Those skilled in the art will be able to make various modifications and improvements within the scope of the above descriptions, but all such modifications and improvements shall come under the scope of the present invention.

What is claimed is:

1. A lens system, comprising at least a first and second lens assembly, wherein the first lens assembly possesses a positive power and includes: a first lens, a second lens, a third lens, and a fourth lens, wherein the first and second lenses are one positive and one negative lenses and combined into a negative power cemented doublet, the refractivity of the negative lens being greater than 1.7 and the relation between the Abbe number of the positive lens ($V_{1p}$) and the negative lens ($V_{1n}$) being:

$$18 < V_{1p} - V_{1n}; \text{ and}$$

wherein said second lens assembly possesses a negative power lens and comprises a fifth lens, a sixth lens, and a seventh lens; wherein
the relation between the focal length $f_w$ of the said lens system at its widest angle setting, and the focal length $f_1$ of the first lens assembly is:

$$1.3 < f_w/f_1 < 1.71;$$

the relation between the back focal length $f_B$ of the said lens system at its widest angle setting, and the focal length $f_s$ of said lens system at the wide-angle setting is:

$$0.22 < f_B/f_s < 0.6; \text{ and}$$

the radius of curvature of the first lens is less than 0.

2. A lens system as claimed in claim 1, wherein the first lens and the second lens form a negative cemented doublet, and the third and fourth lenses are both positive lenses.

3. A lens system as claimed in claim 1, wherein the first lens assembly includes at least an aspheric lenses possessing respective surfaces described by the following equation:

$$Z = \frac{CY^2}{1 + [1 - (1 + K) C^2 Y^2]^{(\frac{1}{2})}} + A_4 Y^4 + A_6 Y^6 + A_8 Y^8 + A_{10} Y^{10}$$

wherein Z is the sag of the aspheric surface, C is the curvature of the aspheric surface, K is quadratic surface constant of the aspheric surface, and Y is the vertical height from the optical axis of the lens to the aspheric surface; the range of $K_1$ and $K_2$ are:
$-5.9 < K_1 < -4.5$
$-3.6 < K_2 < -3.$ 4. A lens system as claimed in claim 3, wherein $K_1$ is −5.5128 and $K_2$ is −3.39188.

* * * * *